Oct. 24, 1944.    M. A. HYDE    2,361,209
PROTECTIVE MOTOR CONTROL SYSTEM
Filed May 15, 1942

WITNESSES:
Robert C. Baird
Wm. C. Groome

INVENTOR
Merritt A. Hyde, Jr.
BY
Paul E. Friedemann
ATTORNEY

Patented Oct. 24, 1944

2,361,209

UNITED STATES PATENT OFFICE 2,361,209

PROTECTIVE MOTOR CONTROL SYSTEM

Merritt A. Hyde, Wilkinsburg, Pa., assignor to Westinghouse Electric & Manufacturing Company, East Pittsburgh, Pa., a corporation of Pennsylvania Application May 15, 1942, Serial No. 443,071

4 Claims. (Cl. 175—294)

My invention relates to electric control systems and more particularly to systems of control for controlling the operation of electric motors.

With prior art devices, to minimize the time interval of the stoppage of an electric motor connected to a circuit subject to severe short-time voltage dips, frequent use is made of a so-called time-delay undervoltage pushbutton in combination with magnetically operated motor starters.

To fully appreciate the novel contribution I make to the art and to fully understand the objects, the description, and claims of my invention, a brief description of some prior art apparatus will be of value. By one prior art scheme use is made, for example, of a simple full-voltage magnetic starter consisting of a magnetic contactor for making and breaking the connection of the motor to the source of supply, together with suitable overload protection, and a pushbutton of the time-delay undervoltage type. The pushbutton functions in such a manner that, upon the occurrence of a severe voltage dip or interruption of voltage, the magnetic contactor opens; then, if the duration of the voltage dip or interruption of voltage is less than the time setting of the pushbutton mechanism, which may be set for, say, two seconds, the voltage, upon returning to the pick-up value of the contactor, will cause the contactor to reclose automatically. If, however, the voltage fails to return to the pick-up value of the contactor within the time setting of the pushbutton, then the pushbutton acts to open the energizing circuit for the coil of the magnetic contactor. The contactor is thus prevented from reclosing when the voltage on the supply does return. It is then necessary to start the motor by manual operation of the pushbutton.

In some cases, where no operation hazards are involved through unexpected restarting of a motor that has stopped by reason of a voltage failure or voltage dip, the control switch may be of the two-wire type or "maintained-single-contact" type, sometimes designated as a "low voltage release." In the "run" position such a device permanently connects the contactor coil of the motor contactor to the supply source, whereas in the "off" position, the coil of the motor contactor is simply disconnected from the supply source.

A broad object of my invention is to reduce to a minimum the time of disconnection of electric apparatus from a source of supply by reason of a voltage dip, or voltage failure, of the source of supply.

Another broad object of my invention is the provision of an electric system in which commercial electromagnetic devices, such as relays and contactors, pick-up at lower supply voltages than was possible heretofore with such devices.

Another object of my invention is to minimize the "outage" time of electric apparatus during a short voltage dip, or temporary voltage failure, of the supply for such electric apparatus.

Other objects and advantages will become more apparent from a study of the following specification and the drawing accompanying the specification, in which drawing.

Whether the hereinbefore mentioned time delay pushbutton or the two-wire master switch is used, after a voltage dip or temporary voltage failure, it is desirable that the motor be reconnected to the supply source just as promptly as the voltage on the supply source returns to a value permitting the motor to exert its normal torque, or near normal torque, in order that there may be a minimum of decrease in the speed of driven apparatus and also a minimum disturbance on the power circuit when the motor is reconnected to the line. In certain manufacturing situations one or the other or both of these considerations may be critical.

After an "outage" or voltage dip low enough to cause the contactor, normally connecting the motor to the supply, to drop out, the value to which voltage must return before the motor will be reconnected to the line depends upon the voltage at which the contactor will pick up. Commercial contactors are regularly guaranteed to pick up at 85% of rated voltage.

Figure 2:
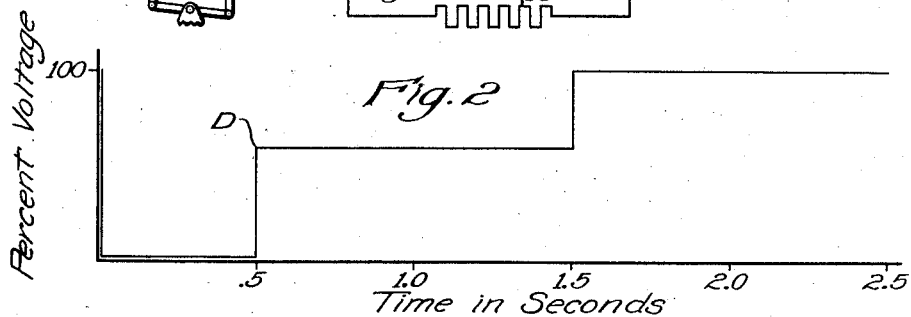
Fig. 2 shows a curve that is helpful in describing my contribution to the art.

Many power systems feed important load centers through two or more circuits. Upon occurrence of a fault, the operation of protective relays and circuit breakers controlling the supplying feeders may be such that the voltage at the load, following an initial low value, is restored to an intermediate range before complete restoration to normal value. For example, at a certain industrial plant location it has been reported that the voltage on such occasion may be, say, from zero to 40 percent for a half-second period, following which it may rise to a value in the order of 70 percent for an additional second, before restoration to normal value. The dotted line in Fig. 2 represents this pattern of voltage behavior.

Application of 70% of full voltage to a motor allows the average motor to deliver approximately full load torque provided the motor is now below pull-out speed. In fact the torque at any speed will be approximately half (49%) of the torque that would be delivered at full voltage. Ordinarily, commercial magnetic contactors will not close at 70% of normal voltage but only at about 85%, or more, of normal voltage. This means, in the illustration given above, that the motor remains disconnected from the power supply for about one and a half seconds.

If the motor could be reconnected to the power line when the voltage is up to 70% of normal, the motor will have slowed down less and will thus be able to develop its full speed torque. If the reconnection of the motor to the supply is delayed for one and a half seconds instead of only one half second, its speed may by that time, be below the pull-out speed. The motor may thus stall. In any event, for some applications, the delay may be critical.

With my systems of control, the motor can be reconnected to the supply with minimum delay by causing the motor contactor to reclose at approximately 70% of normal voltage. At the present state of the art, production of contactors to pick up at 70% of normal voltage is not a commercial expedient.

Figure 1:
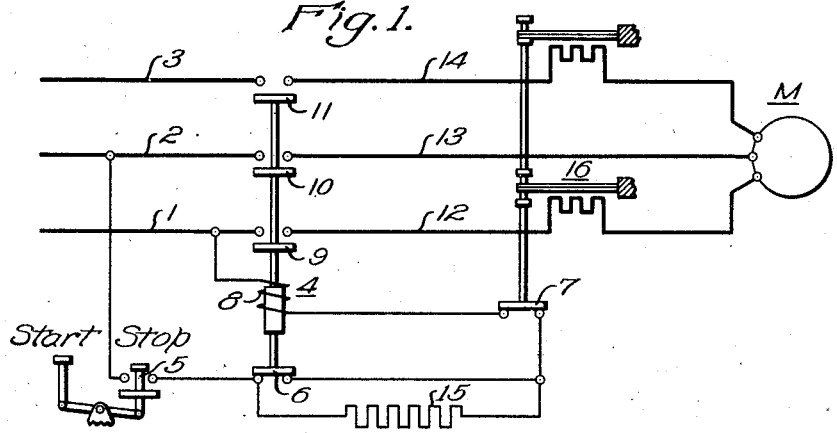
Figure 1 is a diagrammatic showing of one embodiment of my invention.

In Fig. 1, I show a motor M disposed to be connected to the power leads 1, 2 and 3 by the contactor 4. This may be effected as follows: By operation of the "Start" switch a circuit is established from lead 2 through contact members 5 of the "stop" switch, back contact members 6 of contactor 4, contact members 7 of the overload protective relay 16, coil 8 of the contactor 4 to lead 1. Operation of the contactor 4 closes contact members 9, 10 and 11 connecting the motor leads 12, 13 and 14 to leads 1, 2 and 3, respectively. Operation of contactor 4 also opens the shunt circuit for resistor 15 thus placing this resistor in series with coil 8 of the contactor 4.

Instead of the usual practice of designing the contactor 4 to operate on the full circuit voltage, I insert the resistor 15 in series with coil 8 and utilize the auxiliary contact members 6 of the contactor 4 to short-circuit the resistor 15 when the coil 8 is deenergized and to insert the resistor in the coil circuit when the coil is energized.

The ohmic value of the resistor 15 and the characteristics of the contactor 4 are chosen to have a definite relation. The proper relationship can be effected with a contactor of ordinary commercial design characteristics except that the coil is wound, or otherwise designed, for a voltage lower than the normal supply voltage.

The relationship should be such that:

(1) When resistor 15 is in series with coil 8 the combination will operate on normal circuit voltage without overheating;

(2) When resistor 15 is in series with coil 8 the contactor 4 will hold in at any voltage down to 65% of normal supply voltage; and (3) Without resistor 15 in series with coil 8, that is, the resistor 15 shunted, the contactor 4 will pick up at a voltage of 70% of the normal supply voltage.

Assuming that the motor is running, that is, the circuits are all established as hereinbefore traced, namely, contact members 5, 7, 9, 10 and 11 are closed and contact members 6 are open. If the voltage now fails very temporarily, or a sharp dip in voltage to practically zero voltage occurs as indicated by the curve in Fig. 2, the contactor 4 will open contact members 9, 10 and 11, or drop out, and contact members 6 close, shunting resistor 15. Since the resistor 15 is now not in the circuit of coil 8, the contactor 4 will pick up at 70% of normal voltage to connect the motor to the supply. This will occur at point D on the curve or only one half second after the voltage dip began. The moment the contactor picks up the resistor 15 is, of course, reinserted in the coil circuit but, since it obviously takes very much less current to hold a contactor in than to pick it up, the contactor holds contact members 9, 10 and 11 closed.

The motor outage is thus reduced from one and a half seconds, down to one half second.

Figure 3:
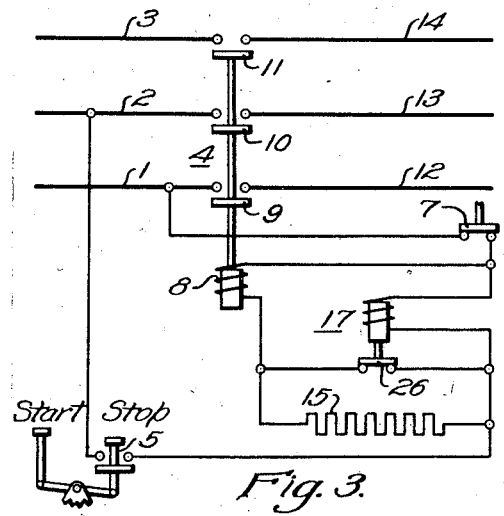
Figs. 3 and 4 are diagrammatic showings of modifications of my invention.

For the modification shown in Fig. 3, an auxiliary relay 17 is used for operating contact members 26 which contact members correspond generally in function to contact members 6. The coil of this relay 17, of regular commercial design for continuous energization at the supply voltage, is connected as shown. This relay is so designed as to have a pick-up voltage above 70% of normal circuit voltage, say 80% normal voltage, and a drop-out voltage just below 70% of normal circuit voltage, say 65%. The ohmic value of resistor 15 and the characteristics of contactor 4 are such that:

(1) When resistor 15 is in series with coil 8, the combination will operate at normal circuit voltage without overheating;

(2) When resistor 15 is in series with coil 8 contactor 4 will hold in at any circuit voltage above approximately 80% of normal; and (3) Without the resistor 15 in series with coil 8 contactor 4, that is, when resistor 15 is shunted, the relay will pull in at 70% of normal voltage.

If the motor is running and a voltage dip occurs relay 17 will drop out and contact members 26 close. Contactor 4 also drops out. Then upon an increase of voltage to 70% of normal contactor 4 picks up reconnecting the motor to the line. Upon restoration of voltage to normal (or any voltage of 80% of normal or above) relay 17 picks up to open contact members 26 placing the resistor 15 in the coil circuit. No other change occurs in the control circuit and the equipment is returned to normal operation.

Figure 4:
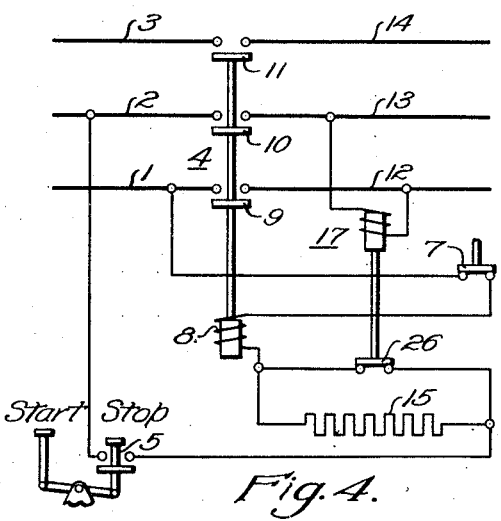

In the modification shown in Fig. 4, relay 17 is merely connected to leads 12 and 13, that is, on the motor side. This arrangement prevents the possibility of the small relay 17 of ever operating ahead of the larger contactor 4, as might occur when the voltage is increased practically instantaneously from partial to full normal circuit voltage.

I do not wish to be limited to the exact embodiments of my invention herein disclosed inasmuch as various changes and modifications, particularly after having had the benefit of my teachings, will appear to those skilled in the art. My invention is to be limited only by the appended claims.

I claim as my invention:

1. In a system of control for an electric device, in combination, a source of electric energy, an electric device, an electromagnetic contactor for connecting said device to the source of energy, said contactor having an actuating coil and an energizing circuit for the coil, said energizing circuit including one terminal of the source of supply, a switch, a resistor, the said coil of the contactor and another terminal of the supply, a relay having an actuating coil so connected to the source of electric energy that opening of the contact members of said electromagnetic contactor deenergizes the relay, contact members operable by the deenergization of said relay for shunting said resistor.

2. In a system of control for an electric motor, in combination, a source of supply subject to voltage dips of relatively short duration, an electromagnetic contactor, having an energizing coil, for connecting and disconnecting the motor and the source of supply, a switch for closing the energizing circuit of the coil of the contactor to thus effect connection of the motor to the supply, an impedance normally in circuit with said coil, electromagnetic means connected on the motor side of said contactor and which electromagnetic means is thus subject to be deenergized by a predetermined voltage dip of said source, and means operable by the deenergization of said electromagnetic means for shunting said impedance.

3. In an electric system, in combination, a source of energy normally having a constant voltage but which at times is subject to temporary voltage dips, which dips of voltage under the worst conditions may involve an almost instantaneous decrease of voltage to zero, then a rise of voltage to about 70% of normal voltage in about half a second and then to normal voltage in about one and one half additional seconds or longer, a load circuit, an electromagnetic contactor of conventional commercial design but having a coil and impedance series circuit combination that will hold the contactor in continuously in closed position to interconnect the load circuit with the source of supply without overheating so long as the voltage of the supply does not drop below about 65% of normal value, an auxiliary relay, connected to the load circuit and thus energized only when the contactor is in closed position, having the characteristic of picking up at slightly above 70% of normal circuit voltage and a dropout voltage equivalent to that of said contactor, contact members controlled by said relay for shunting the impedance when a voltage dip occurs sufficient for the contactor to drop out to deenergize the relay whereby the coil of said contactor is connected directly to the source of supply, said coil of the contactor being so chosen that it pulls the contactor in when the voltage of the supply has risen to about 70% of normal voltage.

4. A motor control system comprising, in combination, a source of supply for said motor, electromagnetic contacting means energized by said source of supply for connecting and disconnecting said motor and said source of supply, said contacting means having the characteristic of operating to connect said motor to said source at a predetermined minimum value of potential of said source sufficient to produce normal torque of said motor, a resistor in series with said contacting means, a relay connected to the source of supply on the motor side of said contactor having contacts adapted to shunt said resistor upon deenergization thereof whereby said contacting means connects said motor to said source of supply with said resistor shunted and thereafter has said resistor inserted in series therewith by operation of said relay.

MERRITT A. HYDE.